(12) United States Patent
Huang et al.

(10) Patent No.: US 10,338,434 B2
(45) Date of Patent: Jul. 2, 2019

(54) BACK-LIGHT MODULE WITH INTERASSEMBLED SET OF FRAMES AND HEIGHT ADJUSTABLE BACK FRAME FORMING LIGHT-MIXING CHAMBER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: I-Ting Huang, New Taipei (TW); Cheng-Fa Chung, New Taipei (TW); Yue-Han Chen, New Taipei (TW); Chih-Hsien Chen, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 15/498,646

(22) Filed: Apr. 27, 2017

(65) Prior Publication Data
US 2018/0143493 A1 May 24, 2018

(30) Foreign Application Priority Data
Nov. 21, 2016 (TW) .............................. 105138135 A (51) Int. Cl.
*G02F 1/1335* (2006.01)

(52) U.S. Cl.
CPC .. *G02F 1/133608* (2013.01); *G02F 1/133606* (2013.01); *G02F 1/133609* (2013.01); *G02F 1/133603* (2013.01); *G02F 2001/133607* (2013.01); *G02F 2001/133612* (2013.01)

(58) Field of Classification Search
CPC ......... G02F 1/133603; G02F 1/133606; G02F 1/133608; G02F 1/133609; G02F 2001/133607; G02F 2001/133612; F21V 17/105
See application file for complete search history.

(56) References Cited

U.S. PATENT DOCUMENTS

| 5,808,707 | A * | 9/1998 | Niibori | G02F 1/133308 349/150 |
|---|---|---|---|---|
| 2003/0234895 | A1 * | 12/2003 | Sugawara | G02F 1/133308 349/58 |
| 2013/0155692 | A1 * | 6/2013 | Federici | F21V 1/02 362/353 |
| 2013/0188100 | A1 * | 7/2013 | Ikuta | G02F 1/00 348/739 |

(Continued)

FOREIGN PATENT DOCUMENTS

TW     201037414     10/2010

*Primary Examiner* — Alan B Cariaso
(74) *Attorney, Agent, or Firm* — ScienBiziP, P.C.

(57) ABSTRACT

A back-light module includes a back board. The back board includes a substrate and a plurality of frame monomers. Each frame monomer comprises four lateral ribs, every two adjacent lateral ribs are perpendicularly connected with each other. The frame monomers are detachably assembled to each other to form a height adjustable back frame, and the height adjustable back frame is assembled with the substrate to form a height adjustable light-mixing chamber.

20 Claims, 7 Drawing Sheets

(56) References Cited

U.S. PATENT DOCUMENTS

| | | | |
|---|---|---|---|
| 2014/0293604 A1* | 10/2014 | Diekmann | F21V 15/01 362/249.01 |
| 2016/0123555 A1* | 5/2016 | Oh | F21V 7/04 362/97.1 |
| 2017/0153501 A1* | 6/2017 | Li | G02F 1/133606 |

* cited by examiner

BACK-LIGHT MODULE WITH INTERASSEMBLED SET OF FRAMES AND HEIGHT ADJUSTABLE BACK FRAME FORMING LIGHT-MIXING CHAMBER

FIELD

The subject matter herein generally relates to a light source module, and more particularly to a back-light module.

BACKGROUND

Back-light modules of liquid crystal displays adopt light-emitting diodes (LEDs) having long service life, high efficiency, and low environmental pollution as light sources. However, a uniform lighting effect requires a plurality of LEDs, which also cause a high cost of a liquid crystal display.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIGS. 1-5 illustrate a back-light module 100 according to a first embodiment. The back-light module 100 includes a back board 10, a lighting module 20, a plurality of secondary optical lenses 30, and an optical film 40.

Figure 1:
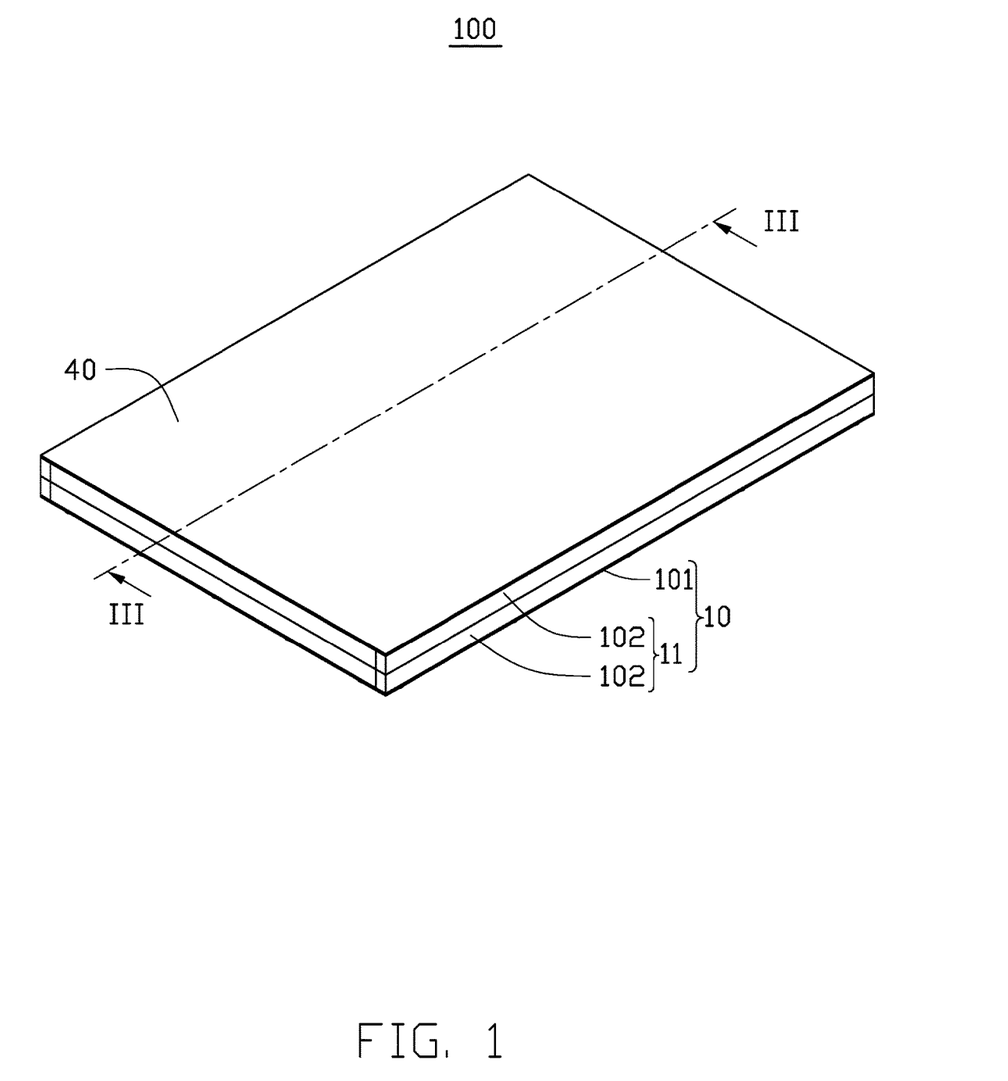
FIG. 1 is an isometric view of a back-light module in accordance with one embodiment.

The back board 10 includes a substrate 101 and a plurality of frame units 102, as shown in FIG. 1. The back board 10 and the frame units 102 are separate moldings. The substrate 101 and the frame unit 102 are made from metal or plastic. Each frame unit 102 includes four lateral ribs 104. Each adjacent two lateral ribs 104 are perpendicularly connected with each other. The frame units 102 are detachably assembled with each other to form a height adjustable back frame 11, the height being dependent on the number of the frame units 102. The substrate 101 and the height adjustable back frame 11 together form a light-mixing chamber 110. The height adjustable back frame 11 is detachably assembled with the substrate 101. A height of the light-mixing chamber 110 is able to changeable according to an amount of the frame units 102.

In the illustrated embodiment, the height adjustable back frame 11 which is assembled with the substrate 101 through screws or glue and only includes two frame units 102. In other embodiments, the number of frame units 102 can be more than two. The frame units 102 of the plurality can be assembled together by welding, clamping, buckling, magnetism, dispensing, or by screws.

Figure 2:
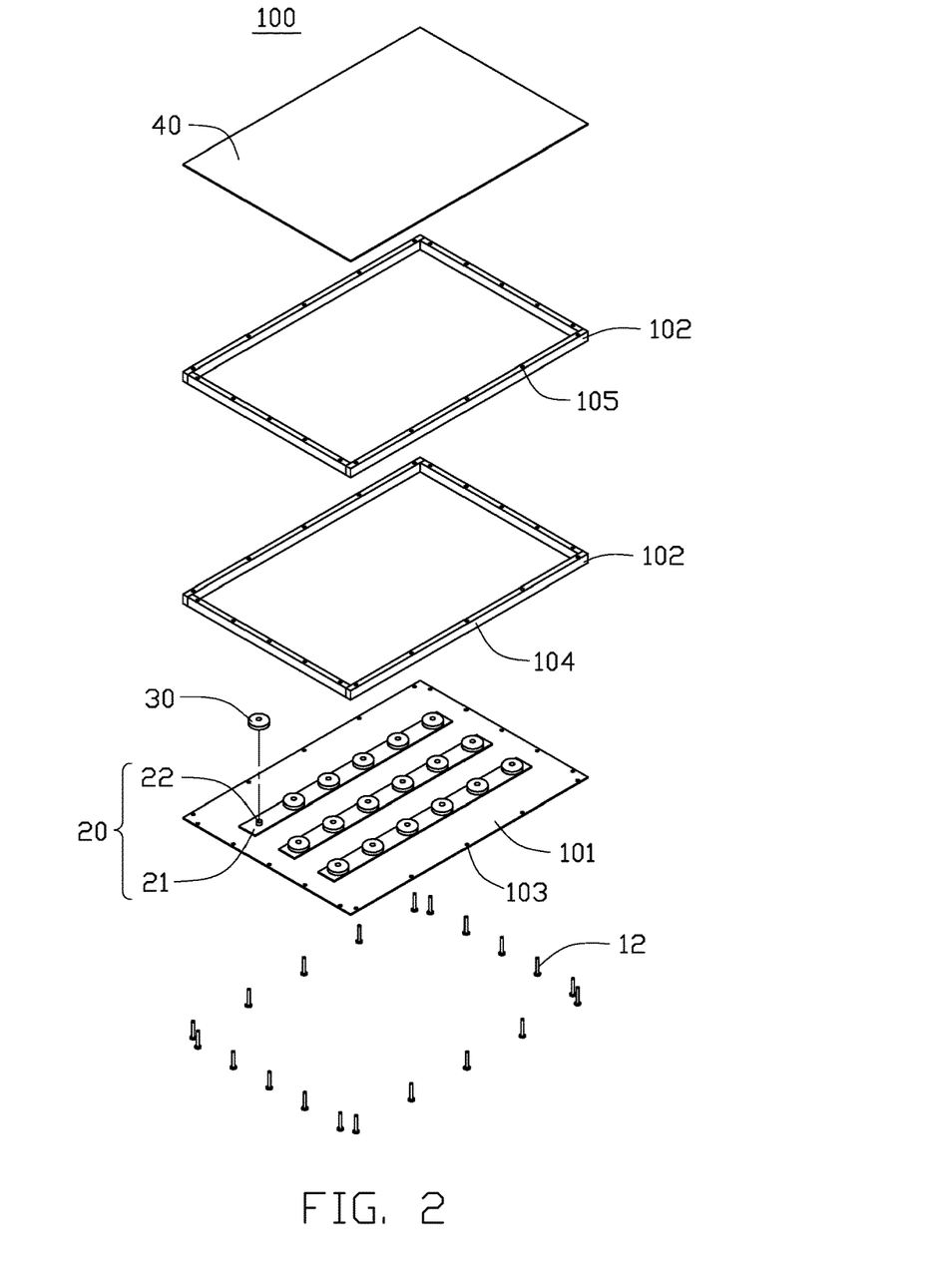
FIG. 2 is a exploded isometric view of the back-light module in FIG. 1.

In an embodiment, the two frame units 102 are fixed together using screws 12, as shown in FIG2. Specifically, the substrate 101 is arranged with a plurality of first screw holes 103 at edges, each lateral rib 104 being arranged with a plurality of second screw holes 105 corresponding to the first screw holes 103. The screws 12 pass through the first screw holes 103 and the second screw holes 105, and the substrate 101 is fixed with the height adjustable back frame 11 thereby.

Figure 3:
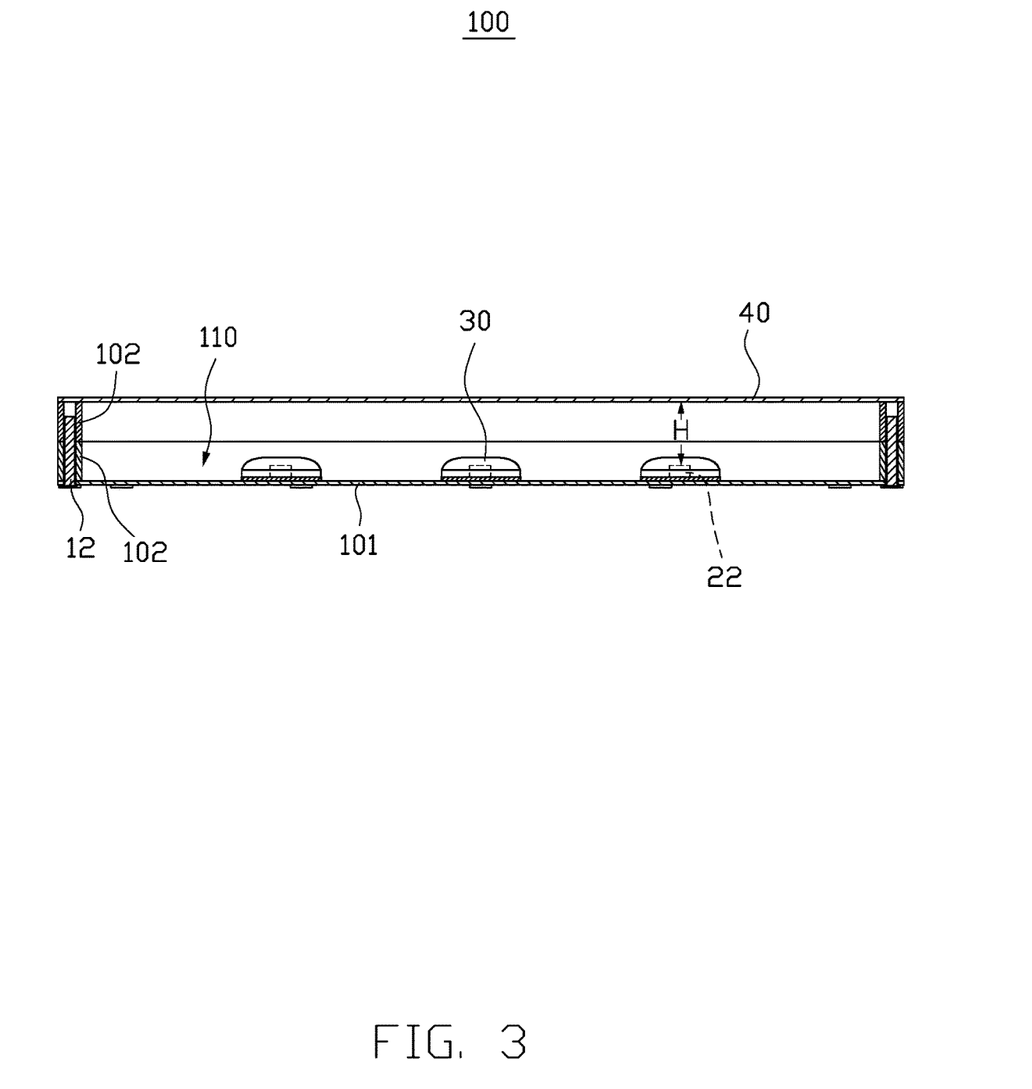
FIG. 3 is a cross-sectional view of the back-light module taken along line of FIG. 1.

The lighting module 20 includes a printed circuit board 21 and a plurality of light emitting diodes (LEDs) 22 mounted thereon. The lighting module 20 is arranged on the substrate 101 and located in the light-mixing chamber 110.

Figure 4:
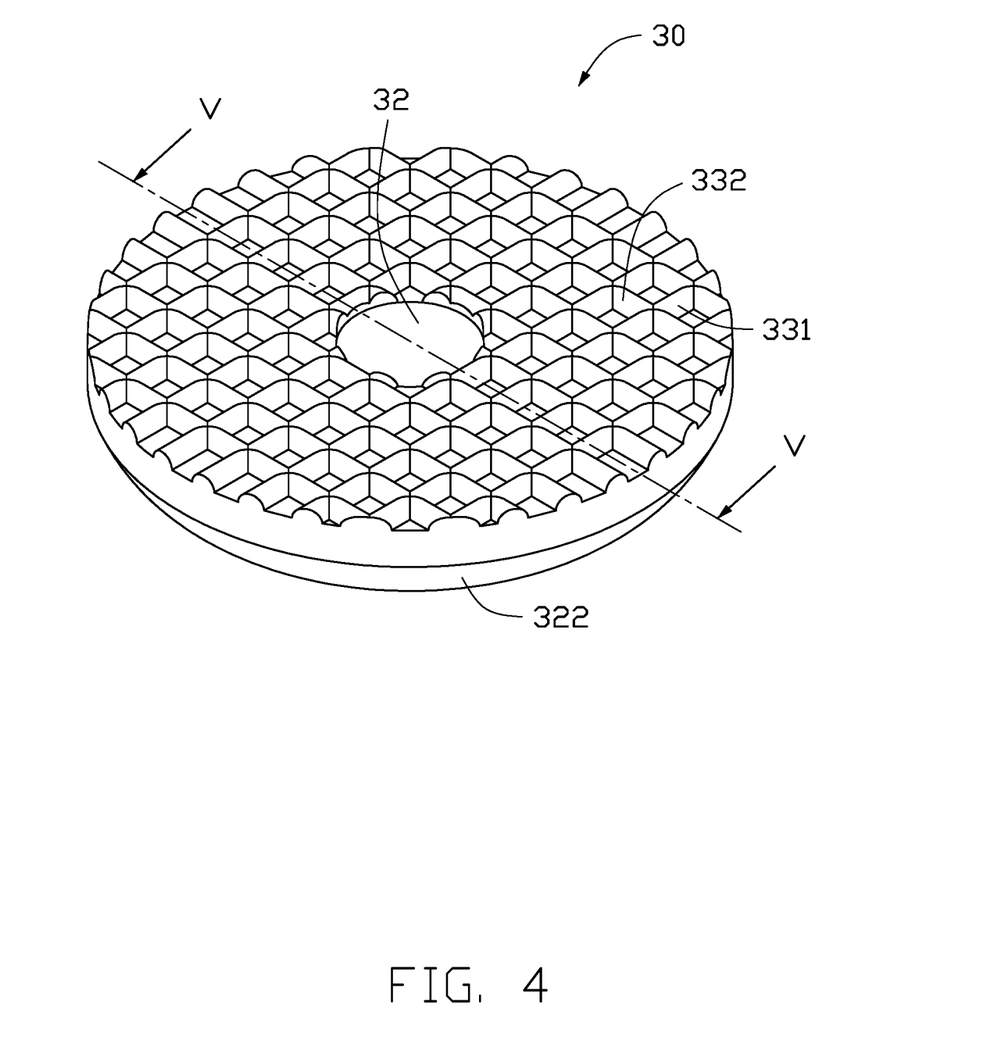
FIG. 4 is an isometric view of a secondary optical lens of the back-light module presented in FIG. 3.
Figure 5:
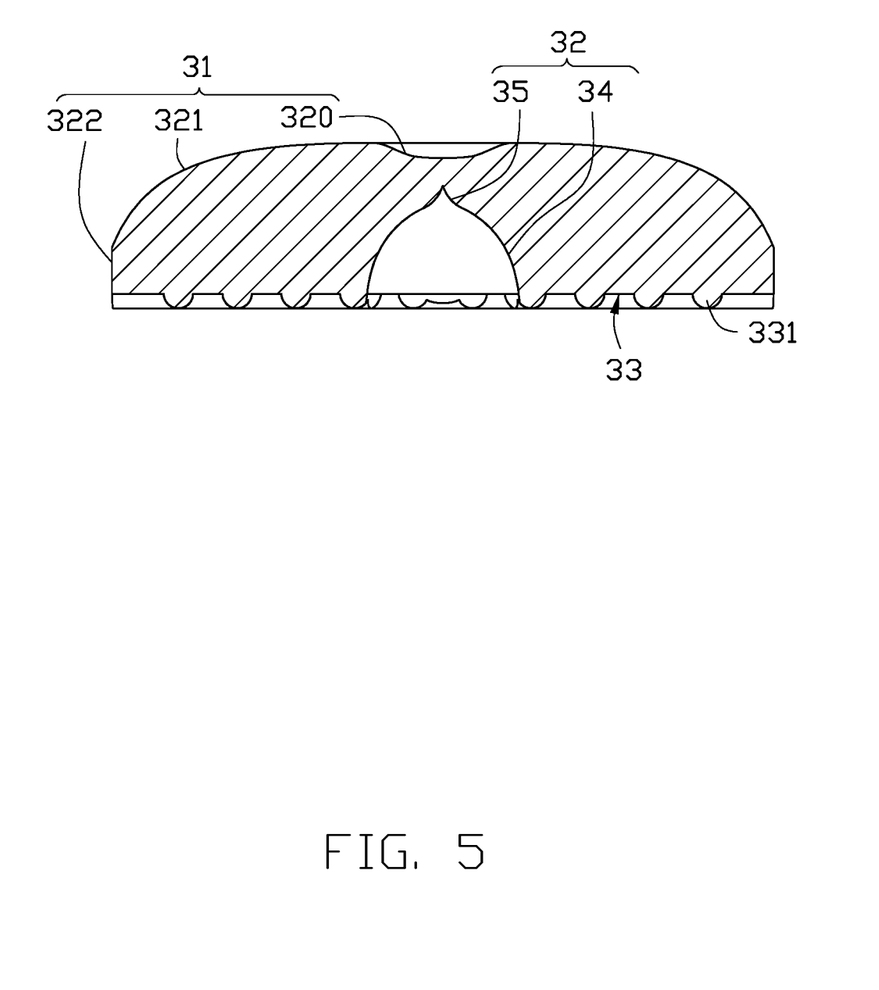
FIG. 5 is a cross-sectional view of the secondary optical lens taken along line V-V of FIG. 4.

The secondary optical lens 30 covers each LED 22 and is fixed on the printed circuit board 21. The secondary optical lens 30 is made from a transparent material with good optical properties, such as PMMA or PC plastic. The secondary optical lens 30 includes a first curved surface 31, a second curved surface 32, and a connecting surface 33 interconnected with the first curved surfaces 31 and the second curved surface 32. The first curved surface 31 covers the second curved surface 32, and a bottom of the second curved surface 32 and a bottom of the first curved surface 31 are on the same horizontal plane. Bottoms of both the first curved surface 31 and second curved surface 32 are interconnected by the connecting surface 33. The second curved surface 32 faces an LED 22.

The first curved surface 31 includes a concave surface 320 at a top center portion of the secondary optical lens 30, an arcuate surface 321 at a periphery side of the concave surface 320, and a side surface 322 around sides of the secondary optical lens 30. The arcuate surface 321 interconnects the concave surface 320 and the side surface 322. The concave surface 320 is located above the top point of the second curved surface 32 and the LED 22. The concave surface 320 can be a concave circle surface recessed downwardly into the secondary optical lens 30 to further diverge the light traveling through the concave surface 320. A radius of curvature of the arcuate surface 321 is greater than that of the concave surface 320.

The second curved surface 32 includes a bottom portion 34 and a spinous portion 35. A bottom edge of the bottom portion 34 is positioned on the connecting surface 33. In this embodiment, a contour profile of the bottom portion 34 is substantially an ellipsoid. A contour profile of the spinous portion 35 is substantially an acute shape. A top point of the spinous portion 35 is positioned on an optical axis of the secondary optical lens 30 and a central axis of the LED 22. The spinous portion 35 is used for diverging light radiating from the LED 22. When the light from the LED 22 strikes the second curved surface 32, part of the light at a center portion travels through the spinous portion 35. All other light is refracted to sides of the secondary optical lens 30.

A plurality of interlaced protruding bars is formed on the connecting surface 33. The protruding bars protrude downwardly from the connecting surface 33. The protruding bars include a plurality of first protrusions 331 and a plurality of second protrusions 332. The first protrusions 331 are parallel to and spaced from each other, and the second protrusions 332 are parallel to and spaced from each other. A shape of each first protrusion 331 is the same as that of the second protrusions 332. Both the first protrusion 331 and the second protrusion 332 are semi-cylindrical.

Take one first protrusion 331 for example, a shape of the cross-section of the first protrusion 331 is a semi-circle. A center of the semi-circle is located on the connecting surface 33. In this embodiment, the second protrusions 332 are parallel to each other and vertically intersect the first protrusions 331. A distance between the centers of each two adjacent second protrusions 332 is 0.6 mm. The first protrusions 331 and the second protrusions 332 are interlaced with each other to present a "#" shape.

When light from the LED 22 passes through the secondary optical lens 30, part of the light travels in the secondary optical lens 30 and strikes the first protrusions 331 and the second protrusions 332. The light strikes the semicircular first and second protrusions 331, 332 with different incident angles. Each point of the first and second protrusions 331, 332 has a different tangent. Thus, the light is reflected by the first protrusions 331 and the second protrusions 332 in different directions, to increase outputting angles of the light and distribute the light evenly.

The optical film 40 is arranged on the height adjustable back frame 11. The optical film 40 and the substrate 101 are located at opposite sides of the height adjustable back frame 11. In the illustrated embodiment, the optical film 40 is a diffusing film. In an alternative embodiment, the optical film 40 is also can be a light enhancing film. Light emitted from the LEDs 22 enters the secondary optical lenses 30, and the secondary optical lenses 30 are configured to unify the rays of light. In detail, part of light rays are incident on the bottom portion 34, and part of light is incident to the spinous portion 35. The part of light rays reaching the spinous portion 35 reflects laterally of the secondary optical lens 30 due to a refraction of the spinous portion 35. Thus the light rays are dispersed.

A light mixing distance H refers to a vertical distance between a center of the LED 22 and the optical film 40, as shown in FIG. 3. Because the back board 10 includes a substrate 101 and a plurality of frame units 102, the substrate 101 and the frame units 102 are separately molded, and the plurality of frame units 102 are detachably assembled with each other. Thus the light-mixing distance H can be changed by increasing or decreasing the number of frame units 102. A light-mixing distance for different needs of different products is realized, and the light-unifying effect of the back-light module 100 is improved.

Figure 6:
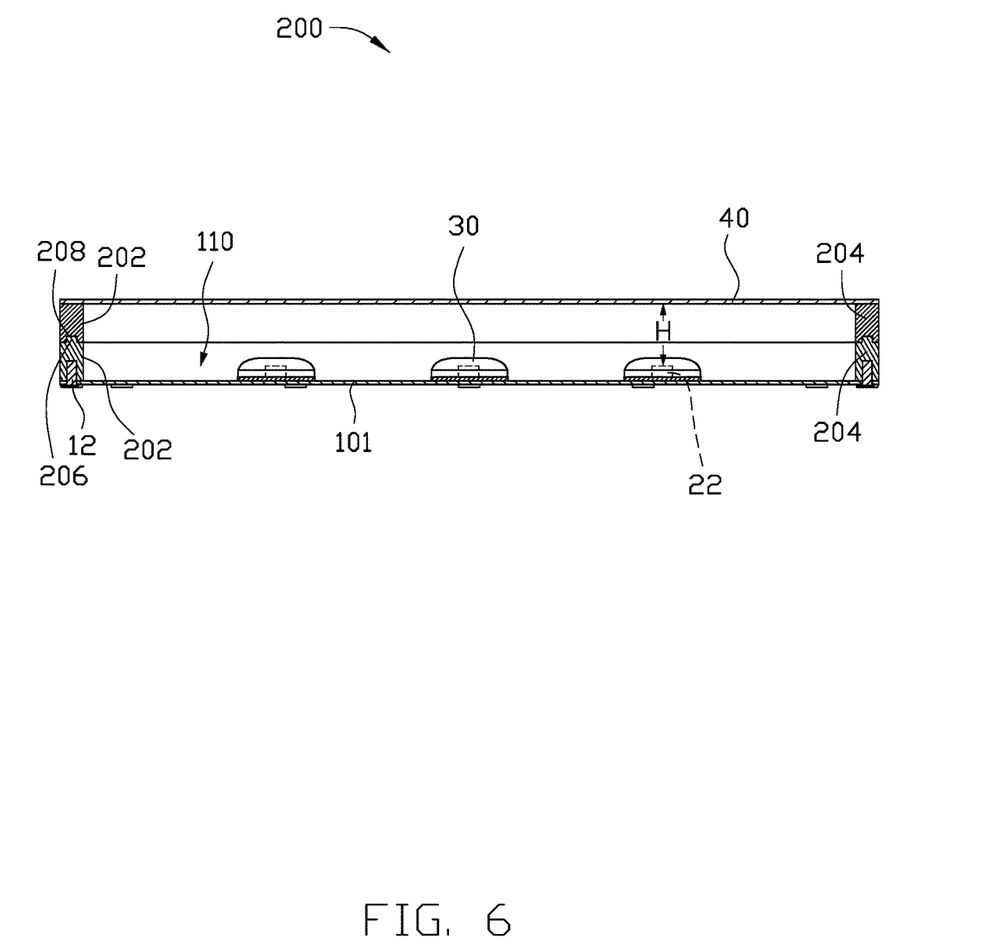
FIG. 6 is an isometric view of a back-light module in accordance with one embodiment.

FIG. 6 illustrates a back-light module 200 according to one embodiment. The back-light module 200 in FIG. 6 is similar to the back-light module 100 in FIG. 3. The difference between the back-light module 200 and the back-light module 100 in FIG. 3 is the method of fixing. The substrate 101 is fixed with the adjacent frame unit 202 through the screws 12, and the frame units 202 are fixed with each other using convex columns inserted into recesses. In particular, the plurality of units 202 are distributed to many couples, each couple includes two frame units 202, four lateral ribs 204 of a first unit 202 of each couple include a plurality of convex columns 206; and four lateral ribs 204 of a second frame unit 202 include a plurality of recesses 208 corresponding to the convex columns. The two frame units 202 in each couple can thus be fixed together through the plurality of convex columns 206 being inserted into the plurality of recesses 208.

Figure 7:
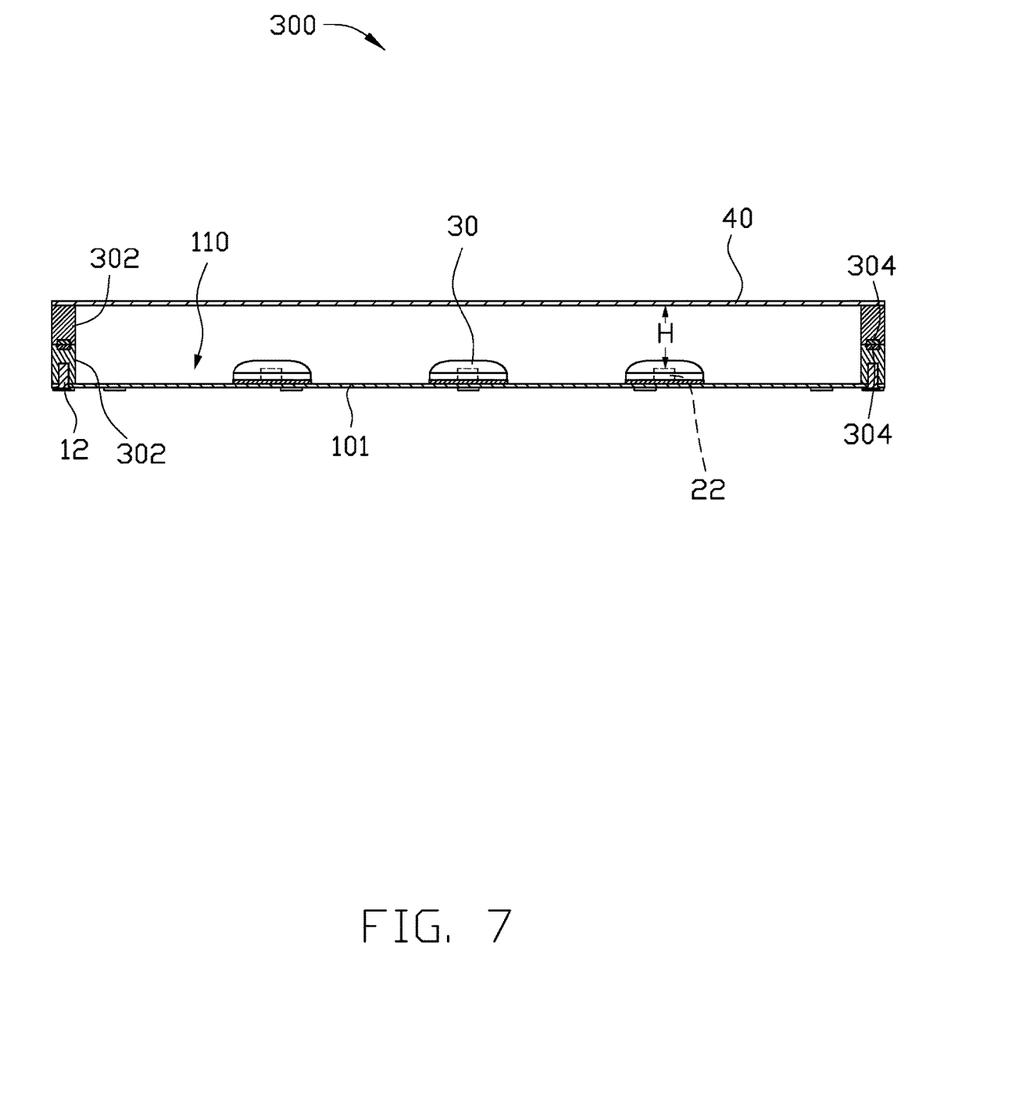
FIG. 7 is an isometric view of a back-light module in accordance with one embodiment.

FIG. 7 illustrates a back-light module 300 according to one embodiment. The back-light module 300 in FIG. 7 is similar to the back-light module 100 in FIG. 3. The difference between the back-light module 300 and the back-light module 100 in FIG. 3 is the method of fixing. The frame units 302 are fixed with each other using magnets 304, that is to say, four lateral ribs 204 of both the two frame units 302 include a plurality of recesses, and each of the plurality of recesses are disposed with a magnet 304. Two or more frame units 202 are fixed together through mutual attraction between the magnets.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A back-light module comprising:
a backboard comprising a substrate, a plurality of frame units and a lighting module, wherein each frame unit comprises four lateral ribs, each two adjacent lateral ribs perpendicularly connected with each other, the frame units are stacked and detachably assembled to each other form a height adjustable back frame, and the height adjustable back frame being assembled with the substrate to form a light-mixing chamber, a height of the light-mixing chamber is able to be changeable according to an amount of the frame units; and the substrate comprises a fixing surface, the fixing surface is a bottom surface of the light-mixing chamber, and the lighting module is fixed on the fixing surface of the substrate and located in the light-mixing chamber.

2. The back-light module of claim 1, wherein a height of the height adjustable back frame is equal to a height sum of the plurality of frame units; and the plurality of frame units are distributed to many couples, each couple comprises two frame units, a first frame unit of each couple forms a plurality of convex columns on a surface toward a second frame unit, and the second frame unit is opened with a plurality of recesses; and the two frame units in each couple are fixed together through the plurality of convex columns being inserted into the plurality of recesses.

3. The back-light module of claim 1, wherein each frame unit comprises a plurality of recesses opened at each lateral rib, each of the plurality of recesses are mounted with a magnet; and the frame units are fixed together through mutual attraction between the magnets.

4. The back-light module of claim 3, wherein the lighting module comprises a printed circuit board and a plurality of light emitting diodes mounted on the printed circuit board.

5. The back-light module of claim 4, wherein the back-light module further comprises a plurality of secondary optical lenses; each of the plurality of secondary optical lenses is disposed on the printed circuit board and covered each light emitting diode.

6. The back-light module of claim 5, wherein each of the plurality of secondary optical lenses is dome-shaped.

7. The back-light module of claim 6, wherein each of the plurality of secondary optical lens comprise a first curved surface, a second curved surface opposite to the first curved surface, and a connecting surface interconnecting bottoms of the first curved surface and the second curved surface; the connecting surface comprises a plurality of first protrusions and a plurality of second protrusions intersecting with the first protrusions, and each the first protrusions and each the second protrusions are semi-terete.

8. The back-light module of claim 7, wherein the first protrusions are parallel to and spaced from each other, and the second protrusions are parallel to and spaced from each other.

9. The back-light module of claim 8, wherein the first protrusions and the second protrusions are the same in configuration.

10. The back-light module of claim 9, wherein the first protrusions intersect the second protrusions vertically.

11. The back-light module of claim 10, wherein the first curved surface comprises a concave surface at a top center portion of the secondary optical lens, an arcuate surface at a periphery side of the concave surface, and a side surface around lateral sides of the secondary optical lens; and the arcuate surface interconnects the concave surface and the side surface.

12. The back-light module of claim 5, wherein the back-light module further comprises an optical film, and the optical film is disposed on the height adjustable back frame; and the optical film and the substrate are located at opposite sides of the height adjustable back frame.

13. The back-light module of claim 12, wherein the optical film is a diffusing film or a light enhancement film.

14. A back-light module comprising:
a back board comprising a substrate and a back frame disposing on the substrate, the back frame comprises a plurality of frame units, each frame unit is stacked and detachably assembled to others, a height of the back frame is adjustable, the substrate and the back frame together form a light-mixing chamber, and the substrate comprises a fixing surface, the fixing surface is a bottom surface of the light-mixing chamber;
a lighting module being disposed on the fixing surface of the substrate and located in the light-mixing chamber; the lighting module comprises a printed circuit board and a plurality of light emitting diodes mounted on the printed circuit board;
a plurality of secondary optical lenses, each of the plurality of secondary optical lens being covered on each light emitting diode and fixed on the printed circuit board; and
an optical film, the optical film being disposed on the substrate opposite to the substrate, and a light-mixing distance between the light emitting diode and the optical film is adjustable with a height of the back frame.

15. The back-light module of claim 14, wherein each frame unit comprises four lateral ribs, each two adjacent lateral ribs perpendicularly connected with each other; a height of the height adjustable back frame is equal to a sum of heights of the plurality of frame units.

16. The back-light module of claim 15, wherein each of the secondary optical lens is dome-shaped.

17. The back-light module of claim 16, wherein each of the plurality of secondary optical lens comprise a first curved surface, a second curved surface opposite to the first curved surface, and a connecting surface interconnecting bottoms of the first curved surface and the second curved surface; the connecting surface comprises a plurality of first protrusions and a plurality of second protrusions intersecting with the second protrusions, each the first protrusions and each the second protrusions are semi-terete.

18. The back-light module of claim 17, wherein the first protrusions are parallel to and spaced from each other, and the second protrusions are parallel to and spaced from each other.

19. The back-light module of claim 18, wherein the first protrusions and the second protrusions are the same in configuration and the first protrusions vertically intersect the second protrusions.

20. The back-light module of claim 19, wherein the first curved surface comprises a concave surface at a top center portion of the secondary optical lens, an arcuate surface at a periphery side of the concave surface, and a side surface around lateral sides of the secondary optical lens; the arcuate surface interconnects the concave surface and the side surface.

* * * * *